United States Patent
Rambo et al.

(10) Patent No.: US 12,286,927 B2
(45) Date of Patent: Apr. 29, 2025

(54) VEHICLE WITH ENERGY CONVERSION SYSTEM

(71) Applicant: General Electric Company, Schenectady, NY (US)

(72) Inventors: Jeffrey Douglas Rambo, Mason, OH (US); Brandon Wayne Miller, Liberty Township, OH (US); David Marion Ostdiek, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/169,889

(22) Filed: Feb. 8, 2021

(65) Prior Publication Data

US 2022/0252011 A1  Aug. 11, 2022

(51) Int. Cl.
| | |
|---|---|
| F02C 7/18 | (2006.01) |
| F02C 6/08 | (2006.01) |
| F02C 7/224 | (2006.01) |
| F02C 9/18 | (2006.01) |
| F02C 7/14 | (2006.01) |

(52) U.S. Cl.
CPC .............. F02C 6/08 (2013.01); F02C 7/224 (2013.01); F02C 9/18 (2013.01); *F02C 7/14* (2013.01); *F02C 7/185* (2013.01); *F05D 2260/213* (2013.01)

(58) Field of Classification Search
CPC .................................... F02C 6/08; F02C 9/18
See application file for complete search history.

(56) References Cited

U.S. PATENT DOCUMENTS

| | | | |
|---|---|---|---|
| 5,123,242 A | 6/1992 | Miller | |
| 5,145,124 A | 9/1992 | Brunskill et al. | |
| 5,255,506 A | 10/1993 | Wilkes et al. | |
| 5,414,992 A | 5/1995 | Glickstein | |
| 6,250,097 B1* | 6/2001 | Lui | B64D 13/06 62/88 |
| 7,765,788 B2 | 8/2010 | Schwarz | |
| 8,261,527 B1* | 9/2012 | Stearns | F02C 7/06 60/39.83 |
| 8,904,753 B2 | 12/2014 | Murphy | |
| 8,967,958 B2 | 3/2015 | Bajusz et al. | |
| 9,038,399 B2 | 5/2015 | MacFarlane | |
| 9,714,610 B2 | 7/2017 | Snape et al. | |
| 9,752,504 B2 | 9/2017 | Aria Chao et al. | |
| 10,024,738 B2 | 7/2018 | Conti et al. | |

(Continued)

FOREIGN PATENT DOCUMENTS

| | | |
|---|---|---|
| EP | 3613969 A1 | 2/2020 |
| FR | 1210698 A | 3/1960 |
| WO | WO2016/083732 A1 | 6/2016 |

*Primary Examiner* — Todd E Manahan
*Assistant Examiner* — Alyson Joan Harrington
(74) *Attorney, Agent, or Firm* — Dority & Manning, P.A.

(57) ABSTRACT

A method for energy conversion for a vehicle is provided. The method including extracting a flow of compressed fluid from a compressor section of a propulsion system; flowing the flow of compressed fluid to a turbine operably coupled to a driveshaft, in which the driveshaft is operably coupled to a load device; expanding the flow of compressed fluid through the turbine to generate an output torque at the driveshaft to operate the load device; and flowing the expanded flow of compressed fluid from the turbine to thermal communication with a thermal load.

11 Claims, 11 Drawing Sheets

(56) References Cited

U.S. PATENT DOCUMENTS

| | | |
|---|---|---|
| 10,107,198 B2 | 10/2018 | Stearns et al. |
| 10,107,200 B2 | 10/2018 | Miller et al. |
| 10,208,676 B2 | 2/2019 | Johnson et al. |
| 10,233,841 B2 | 3/2019 | Bintz et al. |
| 10,344,673 B2 | 7/2019 | Rambo |
| 10,364,750 B2 | 7/2019 | Rambo |
| 10,494,949 B2 | 12/2019 | Rambo et al. |
| 10,508,598 B2 | 12/2019 | Weiner |
| 10,513,981 B2 | 12/2019 | Pesyna et al. |
| 10,989,117 B2 | 4/2021 | Roberge |
| 2007/0245739 A1* | 10/2007 | Stretton ............... F02C 6/08 60/728 |
| 2012/0248242 A1 | 10/2012 | Gagne et al. |
| 2012/0312037 A1* | 12/2012 | Finney ............... B64D 37/34 62/115 |
| 2013/0097992 A1 | 4/2013 | Suciu et al. |
| 2013/0175001 A1* | 7/2013 | Cheong ............... F02K 3/115 165/41 |
| 2013/0186100 A1* | 7/2013 | Rhoden ............ B64D 13/006 60/785 |
| 2015/0369171 A1* | 12/2015 | Papa .................. F02C 7/18 60/782 |
| 2017/0044984 A1 | 2/2017 | Pesyna et al. |
| 2017/0051679 A1* | 2/2017 | Becker, Jr. ............. F02C 9/18 |
| 2017/0335769 A1 | 11/2017 | Boujida et al. |
| 2018/0058333 A1* | 3/2018 | Foutch ................. F02C 9/18 |
| 2019/0153952 A1* | 5/2019 | Niergarth .............. F02C 7/14 |
| 2019/0360401 A1* | 11/2019 | Rambo ............... F02C 7/224 |
| 2020/0025072 A1* | 1/2020 | Mackin ............... B64C 23/06 |
| 2020/0063660 A1 | 2/2020 | Mackin et al. |
| 2020/0108937 A1* | 4/2020 | Behrens ................ F02C 9/18 |

\* cited by examiner

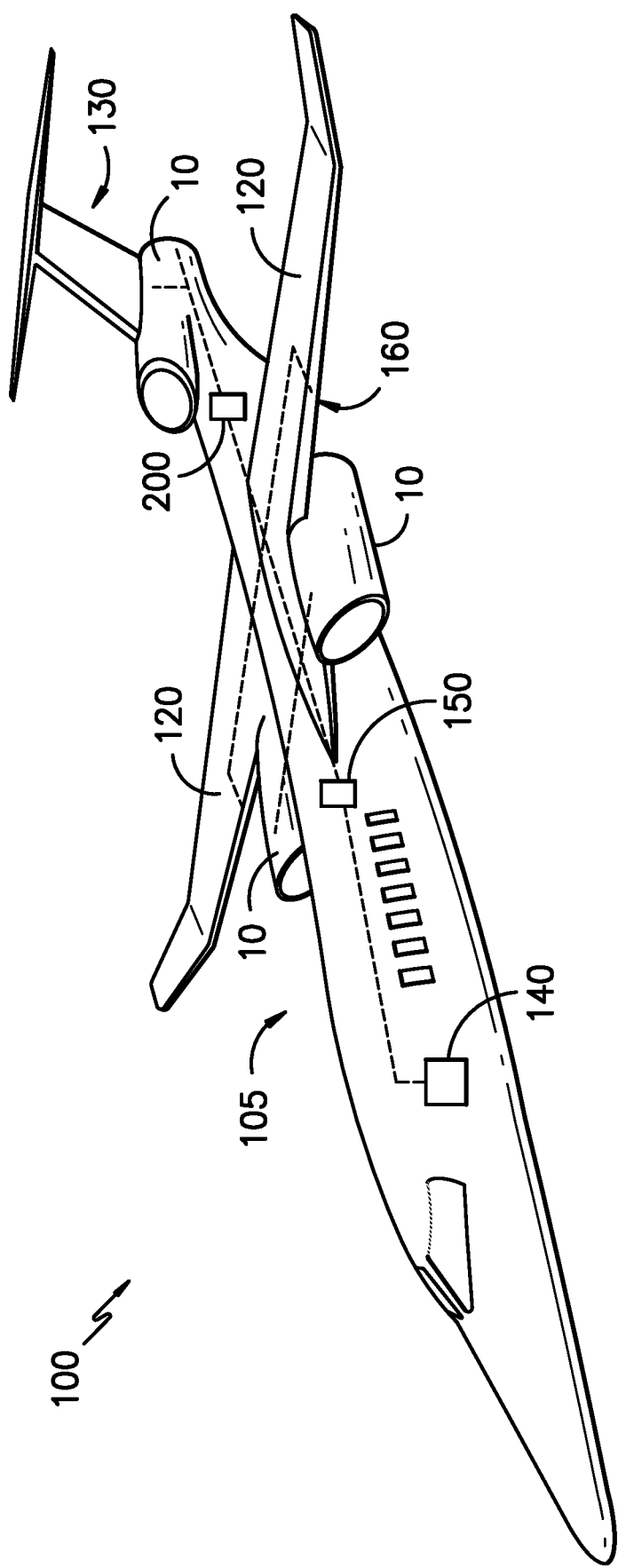
FIG. -1-

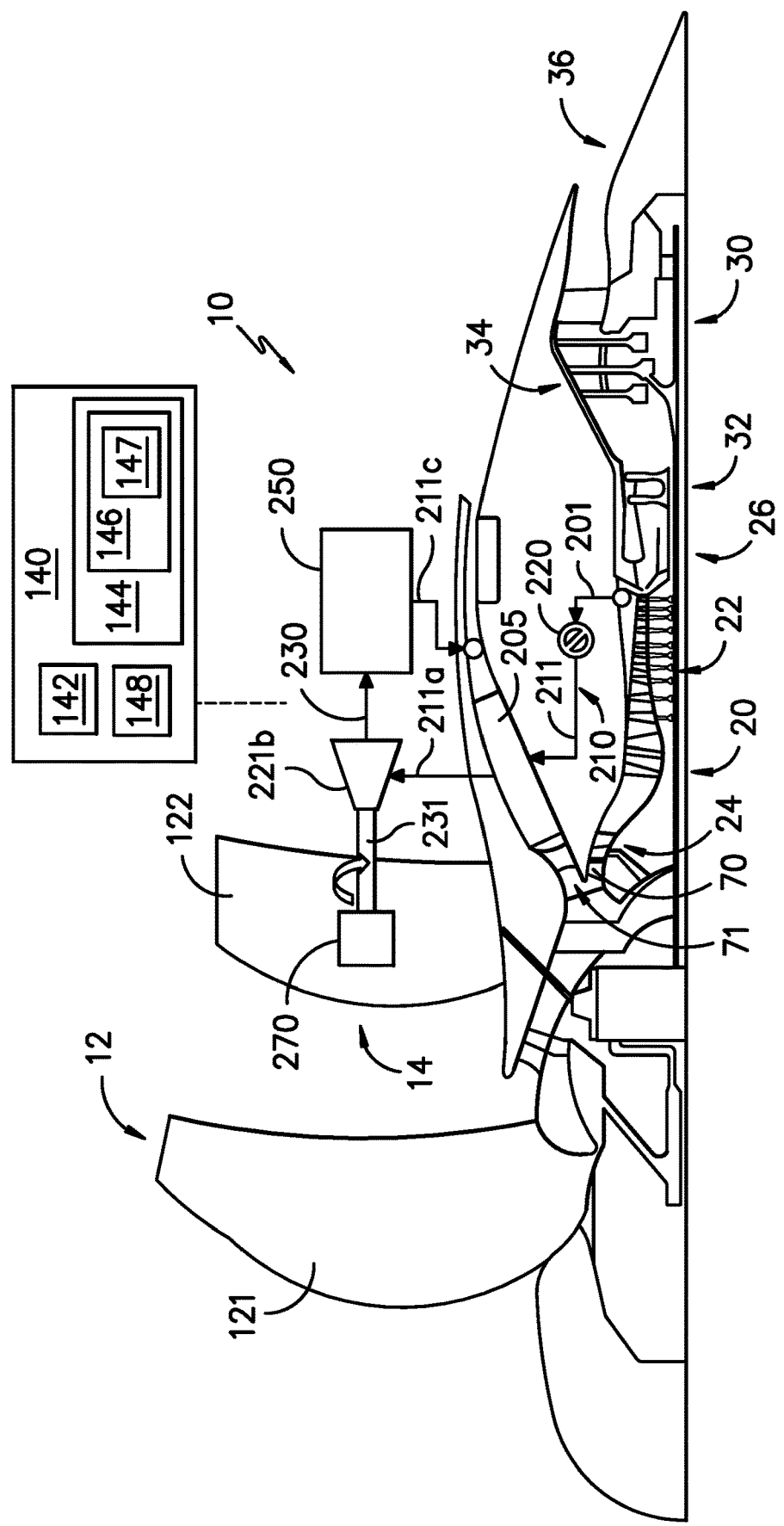
FIG. -2-

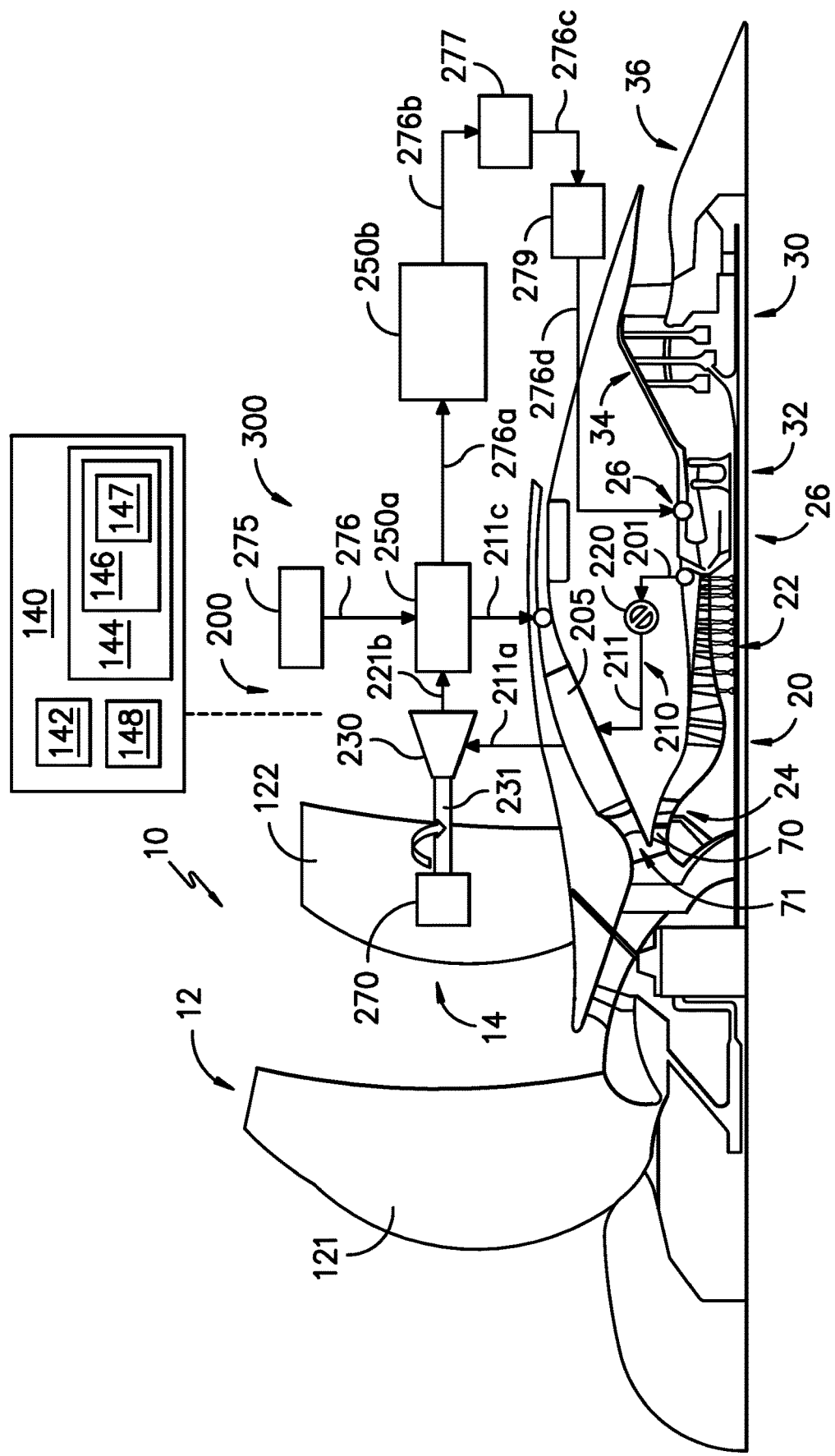
FIG. -3-

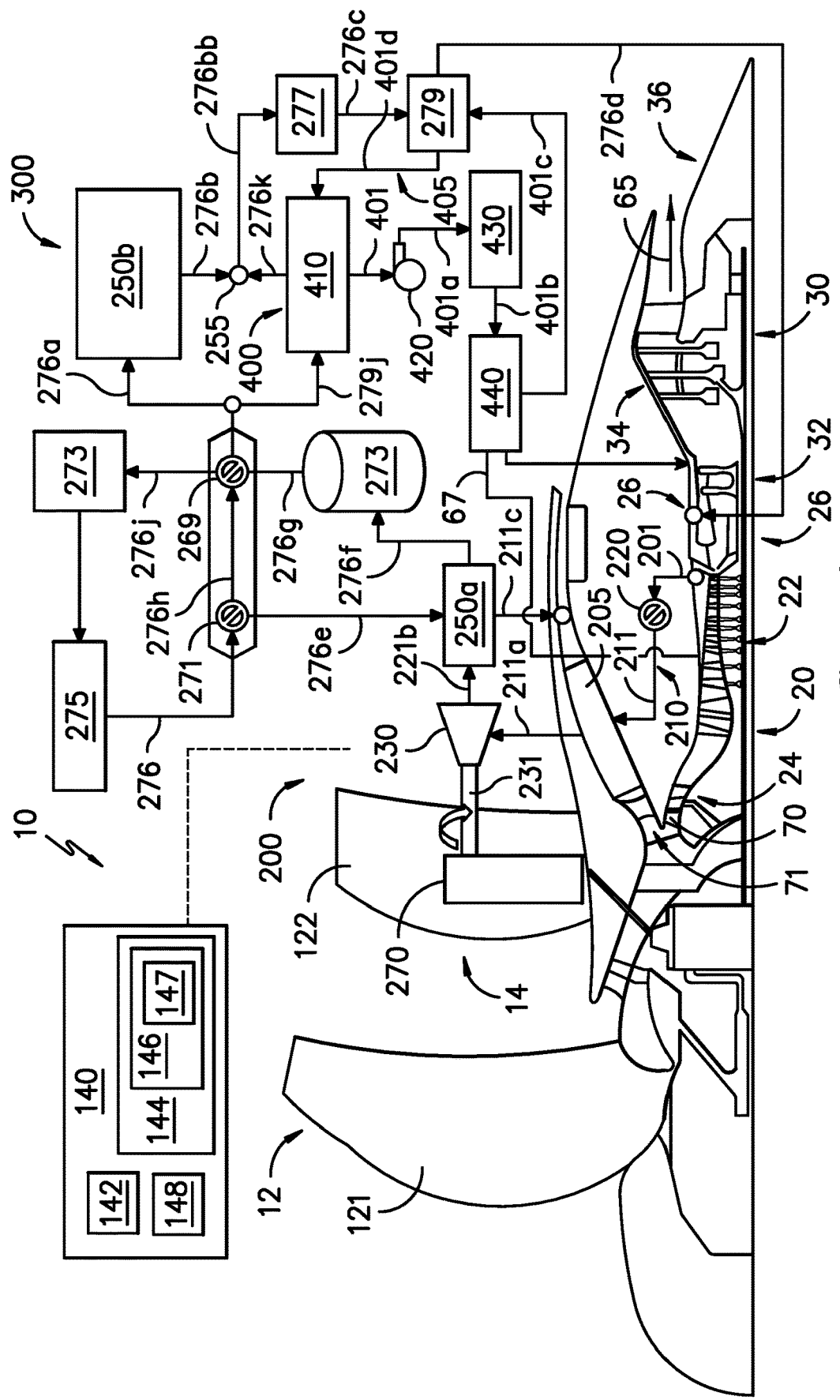
FIG. -4-

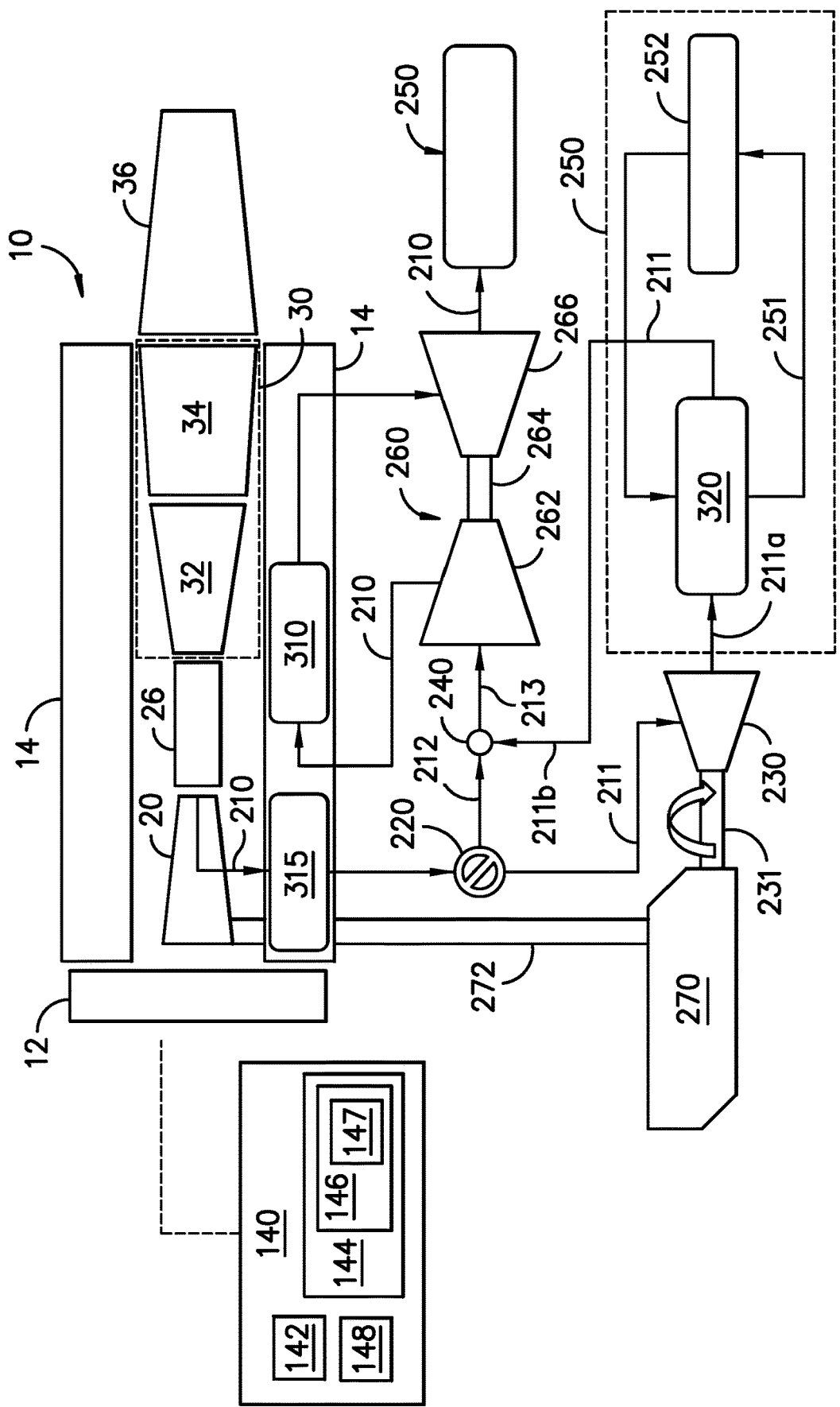
FIG. -5-

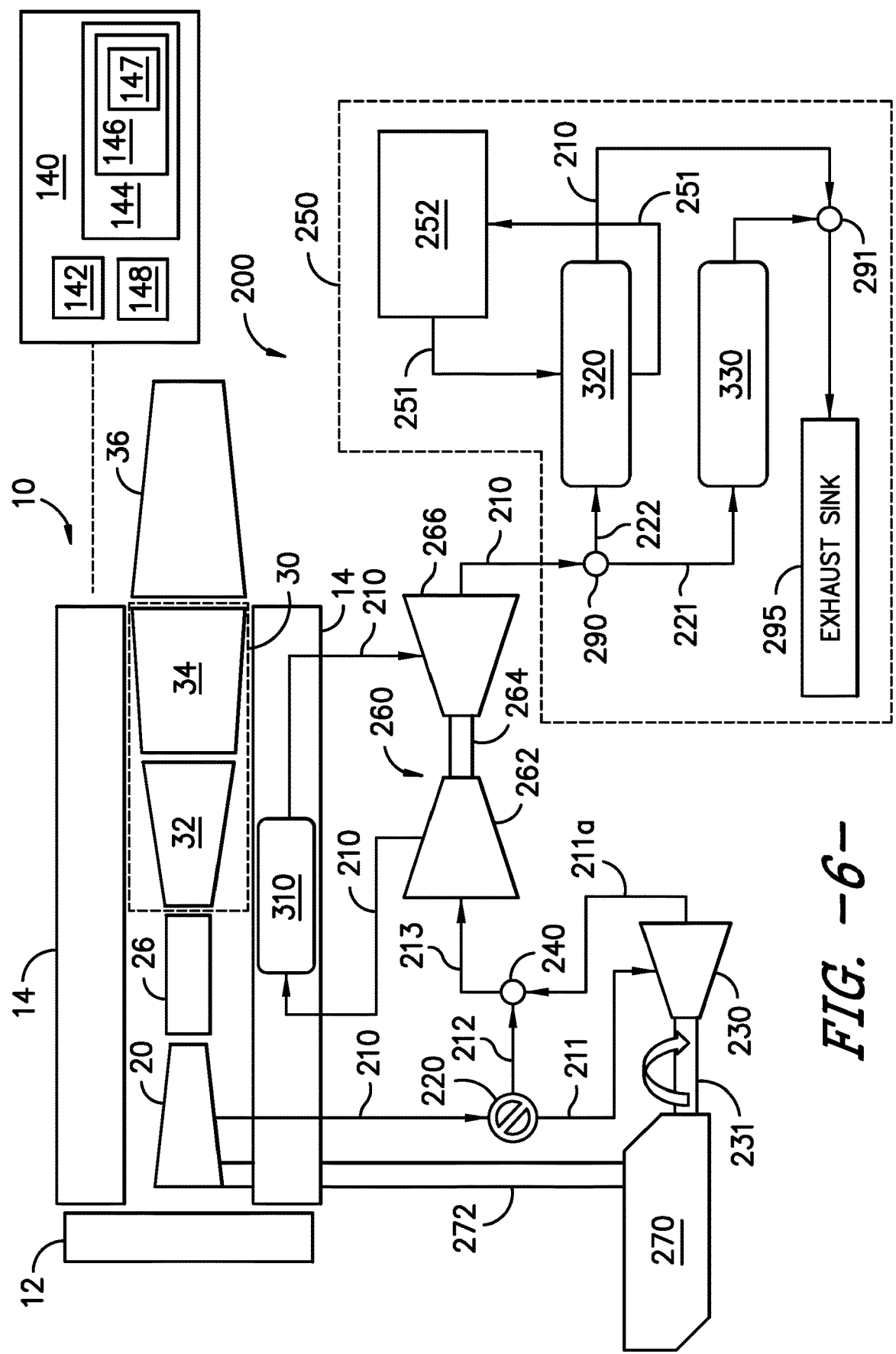
FIG. -6-

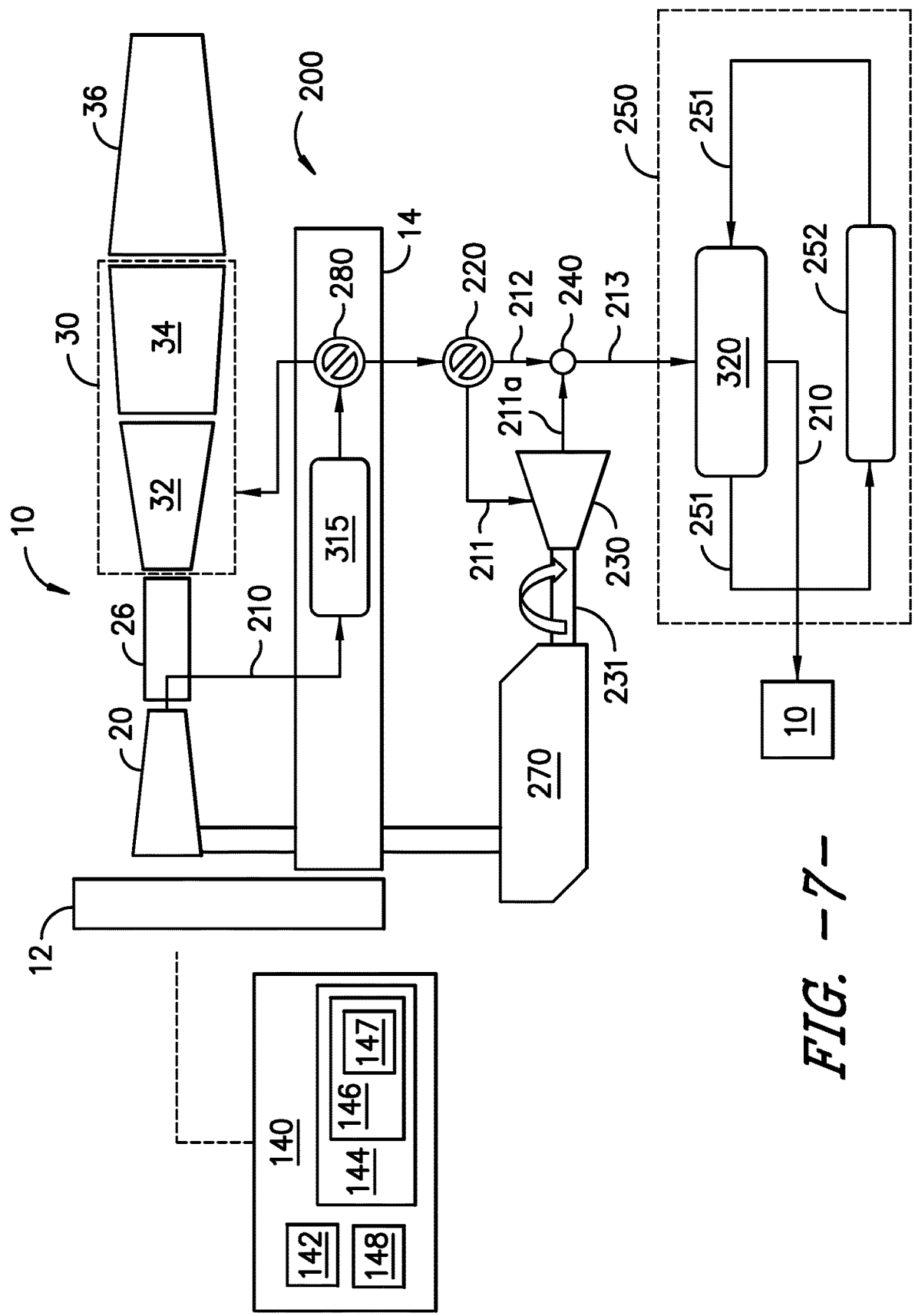
FIG. -7-

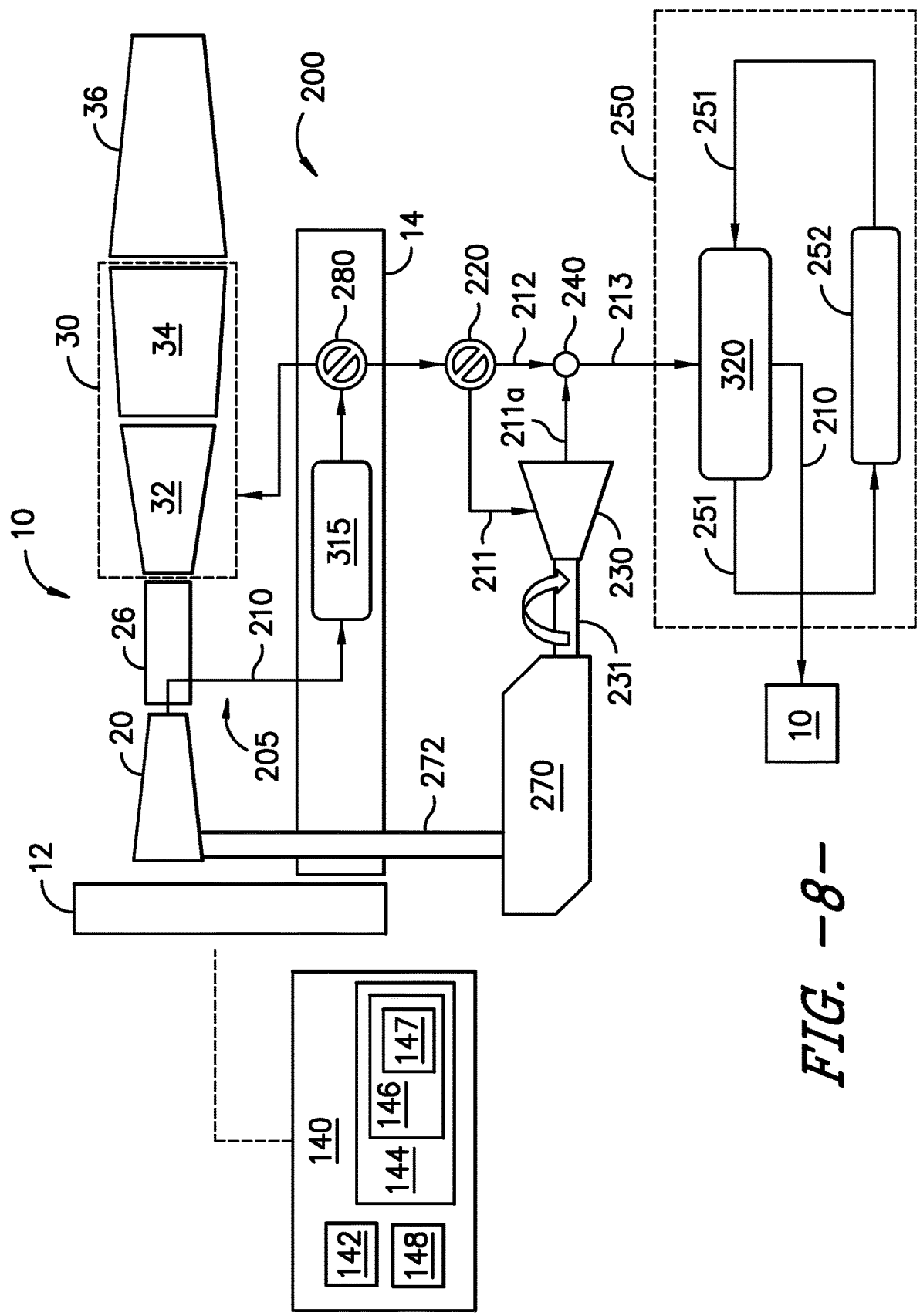
FIG. -8-

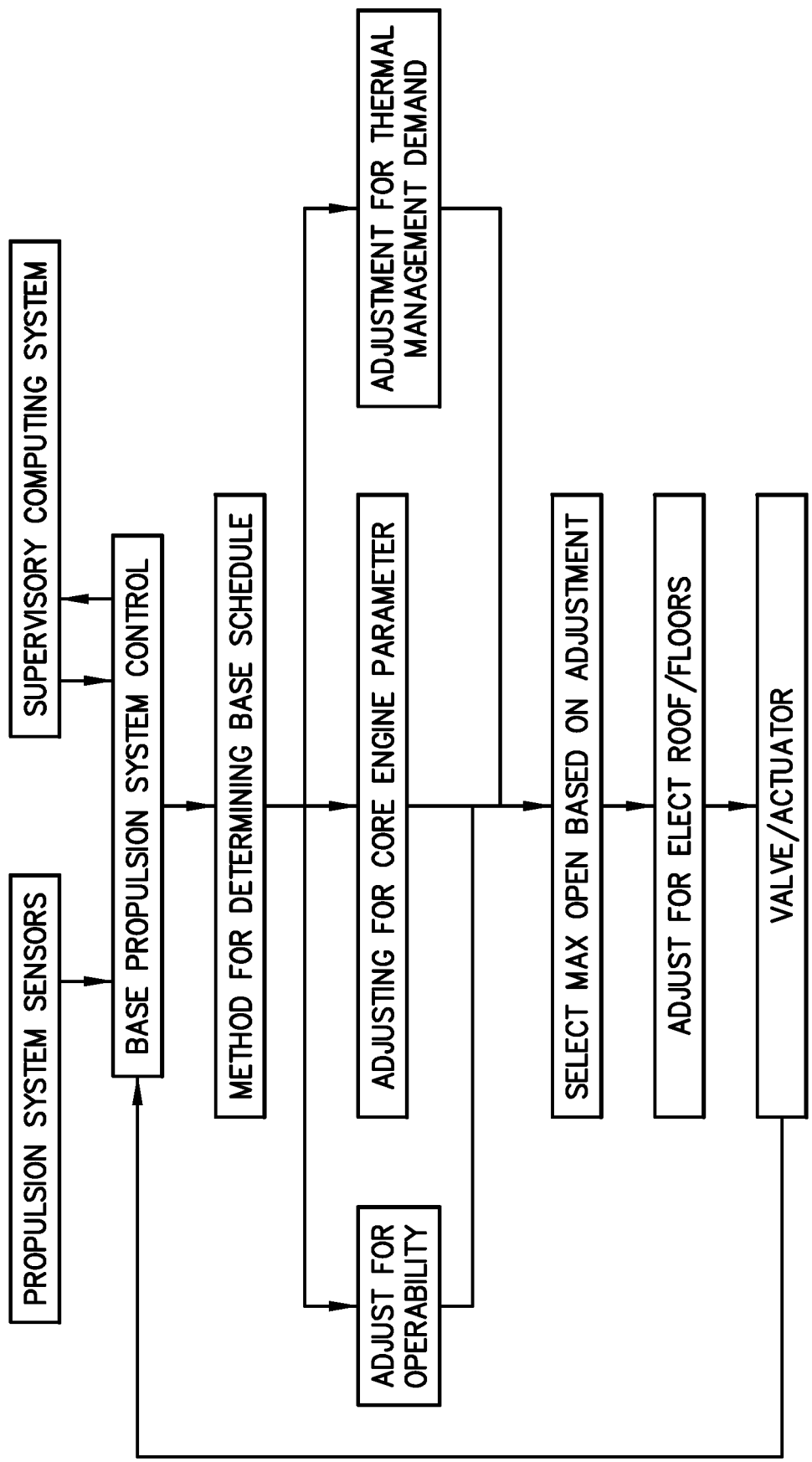
FIG. -9-

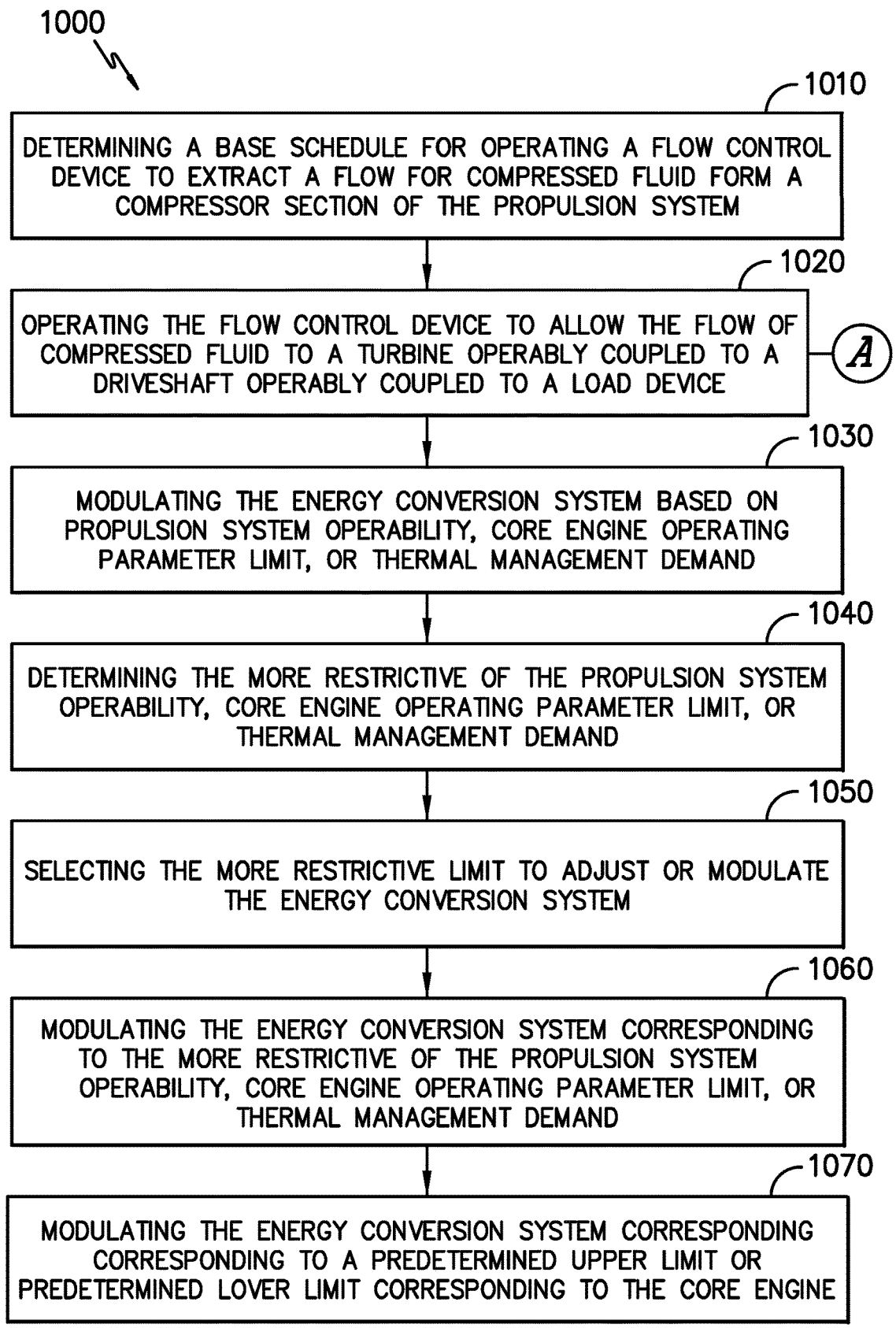
FIG. -10A-

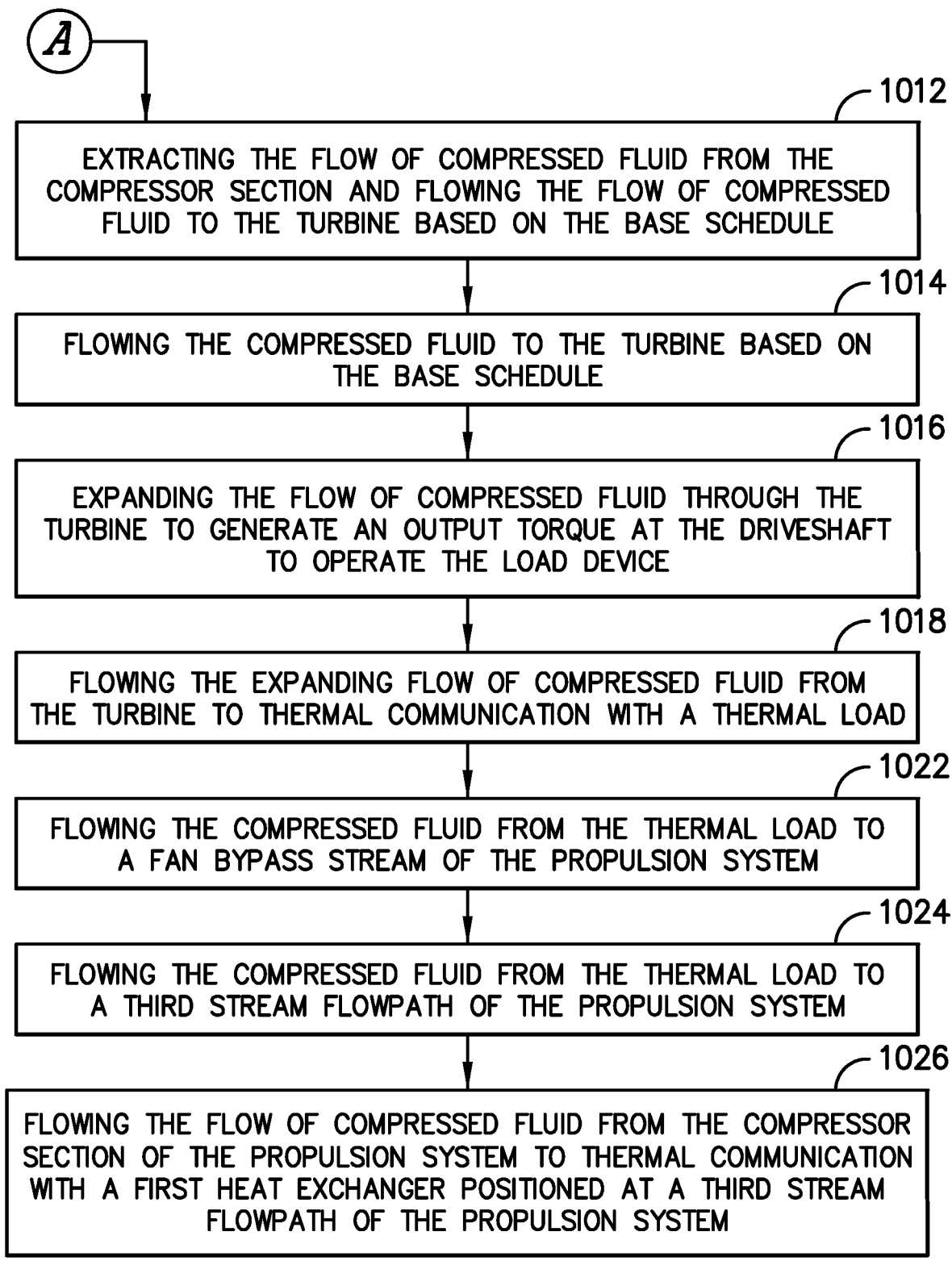
FIG. -10B-

VEHICLE WITH ENERGY CONVERSION SYSTEM

FIELD

The present subject matter relates generally to systems for energy conversion and systems for thermal management for propulsion systems and vehicles. The present subject matter relates to thermal management and energy conversion systems for aircraft and propulsion systems.

BACKGROUND

Propulsion systems, such gas turbine engines, are challenged with thermal management of increasingly higher thermal loads. The increasingly higher thermal loads are due to increasing electrification of propulsion systems and vehicles such as aircraft, greater electric loads, and the need for improved thermal efficiency at fuel systems, oil systems, and cooling fluids. Conventional systems may use an air stream to provide thermal attenuation of a fuel or lubricant. However, such configurations may result in fan stream blockage, reducing engine performance and efficiency. Conventional configurations may also be inadequate to attenuate thermal loads related to reduction gearboxes, variable pitch fans, increased electrification, or third-stream bypass engines. As such, there is a need for improved energy conversion systems and thermal management systems for propulsion systems and vehicles.

BRIEF DESCRIPTION

Aspects and advantages of the invention will be set forth in part in the following description, or may be obvious from the description, or may be learned through practice of the invention.

An aspect of the present disclosure is directed to a method for energy conversion for a vehicle. The method including extracting a flow of compressed fluid from a compressor section of a propulsion system; flowing the flow of compressed fluid to a turbine operably coupled to a driveshaft, in which the driveshaft is operably coupled to a load device; expanding the flow of compressed fluid through the turbine to generate an output torque at the driveshaft to operate the load device; and flowing the expanded flow of compressed fluid from the turbine to thermal communication with a thermal load.

Another aspect of the present disclosure is directed to a vehicle including a propulsion system, an energy conversion system, and a load device. The propulsion system includes a fan section, a compressor section, a heat addition system, an expansion section, and an exhaust section in serial flow arrangement. A core flowpath is formed through the compressor section, the heat addition system, and the expansion section. A fan bypass stream is configured to bypass the core flowpath, and a third stream flowpath is configured to bypass the heat addition system. The energy conversion system includes a fluid circuit forming serial fluid communication of a flow of oxidizer from the compressor section to a turbine. The fluid circuit provides serial fluid communication from the turbine to a thermal load at which the flow of oxidizer is in thermal communication with a flow of fluid at the thermal load. The load device operably coupled to the turbine by a driveshaft. The turbine and the driveshaft are configured to generate an output torque at the load device via expansion of the flow of oxidizer at the turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exemplary embodiment of a vehicle including a propulsion system and energy conversion system according to aspects of the present disclosure;

FIGS. 2-8 are schematic embodiments of the propulsion system and energy conversion system according to aspects of the present disclosure;

FIG. 9 is a schematic flowchart outlining a method for operation of a propulsion system and energy conversion system; and FIGS. 10A-10B are schematic flowcharts outlining steps for a method for operation of a propulsion system and energy conversion system.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system, vehicle, and energy conversion system are provided herein that may improve overall system and vehicle efficiency, such as through utilizing a relatively high pressure fluid from a compressor section of the propulsion system rather than utilizing a pressure regulator or releasing fluid to e.g., an atmospheric condition. As such, work extracted from air removed from the propulsion system may be maximized. Embodiments provided herein may further improve heat transfer from lubricant in a lubricant system. Still further, embodiments provided herein may improve heat transfer from lubricant and additionally from one or more load devices, such as computing systems, environmental control systems, avionics systems, or electric machines. Additionally, or alternatively, cooling fluid at the fluid circuit may be independently adjustable relative to operating condition at the propulsion system, such as via the flow control device and/or the flow device. Embodiments provided herein may include particular serial or parallel flows and components to advantageously improve heat transfer and overall system efficiency. Certain embodiments may allow for substantially independent adjustability of the heat exchange fluid relative to propulsion system operating condition, a lubricant system operating condition, or a load system operating condition.

Referring now to the drawings, in FIG. 1, an exemplary embodiment of a vehicle 100 including a propulsion system 10 and an energy conversion system 200 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 according to aspects of the present disclosure is attached to one or more portions of the airframe. In various embodiments, the energy conversion system 200 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the propulsion system 10. The vehicle 100 may further include an environmental control system (ECS) 150, such as to provide thermally conditioned air to a cabin of the vehicle, the computing system 140, a vehicle surface anti-icing system 160, a propulsion system anti-icing system, or other system of the vehicle 100 or propulsion system 10. In various embodiments such as described herein, the energy conversion system 200 may be configured to provide thermally conditioned fluid to one or more of the systems described herein.

Referring now to FIGS. 2-4, exemplary schematic embodiments of the propulsion system 10 and energy conversion system 200 are provided. The propulsion system 10 may generally be configured as a Brayton cycle machine. Particular embodiments of the propulsion system 10 may be configured as a turbomachine, a ramjet engine, or a scramjet engine. Still particular embodiments of the propulsion system 10 may include a turbomachine configured as a turbofan, turboprop, turbojet, turboshaft, propfan, or open rotor engine. In FIGS. 2-4, the propulsion system 10 is configured as a three-stream engine including a fan bypass stream 14, a core flowpath 70, and a core bypass or third stream 71. Certain embodiments of the propulsion system 10 include a fan section 12, a compressor section 20, a heat addition or combustion section 26, an expansion section 30, and an exhaust section 36 in serial flow arrangement. In various embodiments, the heat addition system 26 may be configured as a deflagrative combustion system or a detonative combustion system. The heat addition system 26 may include any suitable type of system for receiving a flow of liquid and/or gaseous fuel and generating hot gases, including, but not limited to, annular, can-annular, can, trapped vortex, volute or scroll, rotating detonation, pulse detonation, subsonic or supersonic combustion systems. The fan section 12 includes one or more stages of rotors and blades 121. Certain embodiments further include one or more stages of vanes that are stationary relative to a centerline axis of the propulsion system 10.

The compressor section 20, the heat addition system 26, and the expansion section 30 are generally positioned in serial aerodynamic flow arrangement. The compressor section 20, the heat addition system 26, and the expansion section 30 may together define a core engine or gas generator of the propulsion system 10. In certain embodiments, such as described herein, the compressor section 20 includes a high pressure compressor 22 positioned in direct serial flow arrangement with the heat addition system 26 and a high pressure turbine 32 of the expansion section 30. A low pressure turbine 34 of the expansion section 30 may be operably coupled to the fan section 12 to drive the one or more stages of the fan section 12. In certain embodiments, the propulsion system 10 may include an intermediate pressure compressor or low pressure compressor 24 positioned aerodynamically between the fan section 12 and the high pressure compressor 22. In still further embodiments, an intermediate press turbine may be positioned aerodynamically between the high pressure turbine 32 and the low pressure turbine 34.

The core flowpath 70 is extended through at least the high pressure compressor 22, the heat addition system 26, and the high pressure turbine 32. The core bypass or third stream flowpath 71 is extended from downstream of the intermediate or low pressure compressor 24 and bypasses the core flowpath 70 at the high pressure compressor 22. In certain embodiments, the third stream flowpath 71 is extended into fluid communication downstream of the vanes 122 at the fan bypass stream 14.

The third stream flowpath 71 is an air stream configured to recover fluid energy to produce a portion of total thrust of the propulsion system 10. During operation, a pressure ratio of the third stream flowpath 71 is higher than a pressure ratio at the fan bypass stream 14. In one embodiment, the portion of total thrust produced through the third stream flowpath 71 may include a dedicated exhaust nozzle at an outlet end. In another embodiment, the portion of total thrust produced through the third stream flowpath 71 may be mixed with the fan bypass stream 14. In still another embodiment, the portion of total thrust produced through the third stream flowpath 71 may be mixed with the core flowpath 70 downstream of the heat addition system 26, and egressed through the exhaust section 36. Various embodiments of the third stream flowpath 71 are configured to generate less than 50% of the total thrust of the propulsion system 10. In certain embodiments, during operation the third stream flowpath 71 is configured to generate 2% or more of the total thrust of the propulsion system 10. In an embodiment, the propulsion system 10 is configured to generate 2% or more of total thrust and up to 50% of total thrust at a takeoff condition, full load condition, or rated takeoff power condition. An exemplary rated takeoff power condition may be relative to sea level static flight at 86 degree Fahrenheit ambient temperature operating condition.

In certain embodiments, an operating temperature of air through the third stream flowpath 71 is less than a maximum compressor discharge temperature of the propulsion system 10. In a particular embodiment, the operating temperature of air through the third stream flowpath 71 is less than approximately 350 degrees Fahrenheit. In another embodiment, the operating temperature of air through the third stream flowpath 71 is less than approximately 250 degrees Fahrenheit. In still another embodiment, the operating temperature of air through the third stream flowpath 71 is less than approximately 200 degrees Fahrenheit. In various embodiments, the operating temperature of air through the third stream flowpath 71 is at least an ambient temperature, or at least the temperature of air entered into the compressor section. It should be appreciated that ranges of operating temperatures through the third stream flowpath 71 may allow heat transfer to or from the third stream flowpath 71 and another flowpath (e.g., the fan bypass flowpath 14 or the core flowpath 70).

It should be appreciated by those skilled in the art that the third stream flowpath 71 is extended from the core flowpath 70 upstream of the heat addition system 26. In certain embodiments, the third stream flowpath 71 is extended from downstream of the fan section 12. In still various embodiments, the third stream flowpath 71 is configured to allow the flow of air to egress the propulsion system 10 to generate a portion of the total thrust of the propulsion system 10 such as described herein.

Furthermore, it should be appreciated by those skilled in the art that the third stream flowpath 71 differentiates from bleed circuits or other flowpaths at least in part via the egress of air as propulsive thrust. The fan bypass flowpath 14, the third stream flowpath 71, and the core flowpath 70 may each include exhaust nozzle structures. Such structures may include variable area structures, fixed-area structures, convergent-divergent nozzles, thrust vectoring structures, lobed exhaust mixers, or other suitable exhaust structures. The propulsion system 10 may be configured to passively adjust thrust output from the third stream flowpath 71. In certain embodiments, the propulsion system 10 may be configured to actively adjust thrust output from the third stream flowpath 71, such as via adjusting fuel flow, electric machine loading, variable stators, variable inlet guide vanes, variable exhaust area or geometry, or fluidic features generally, and based on a desired performance relative to an operating condition.

Referring still to FIGS. 2-4, the energy conversion system 200 includes a first heat exchanger 205 positioned in thermal communication with the third stream flowpath 71. The energy conversion system 200 includes a walled conduit forming a fluid circuit 210, such as pipes, manifolds, or other appropriate structures configured to extract and flow air, or oxidizer generally, from the core flowpath 70. In various embodiments, a flow of air, depicted schematically via arrows 201, is extracted from one or more stages of the high pressure compressor 22, or from non-combusted air at the heat addition system 26 downstream of the high pressure compressor 22.

The energy conversion system 200 includes a flow control device 220 positioned at the fluid circuit 210 downstream of the compressor section 20. A turbine 230 is positioned at the fluid circuit 210 downstream of the compressor section 20. In particular embodiments, the flow control device 220 and the turbine 230 are integrated as a variable area turbine nozzle (VATN). The flow control device 220 and the turbine 230 together defining the VATN are together configured to control mass flow into or through the turbine 230. In one embodiment, the first control valve 220 is a variable area structure, such as a variable area nozzle, at an inlet of the turbine 230. However, in other embodiments, the first control valve 220 is a separate flow control structure configured to adjust mass flow through the turbine 230. In certain embodiments, the turbine 230 is downstream of the flow control device 220.

A driveshaft 231 is operably coupled to the turbine 230 to drive a load device 270. In various embodiments, the load device 270 includes one or more of an electric machine, a mechanical drive device, or a fluid flow device. For instance, the load device 270 may form an accessory gearbox, a reduction gear assembly, a fan pitch assembly, or a main gearbox assembly. The load device 270 is operably coupled to the propulsion system 10, such as a shaft, or particularly a high speed spool connecting the high pressure compressor 22 and the high pressure turbine 32. The load device 270 may include one or more fuel pumps, electric machines (e.g., motors and/or generators, constant frequency or variable frequency machines, hybrid powertrains, etc.), lubricant pumps, hydraulic pumps, air compressors, engine starter, sensor drives, and auxiliary gearbox drives, or combinations thereof. Expansion of the fluid at the turbine 230 at least partially provides energy to drive the load device 270.

Referring still to FIGS. 2-4, the energy conversion system 200 includes a thermal load 250 positioned in thermal communication with the flow of air through the fluid circuit 210 downstream of the turbine 230. In various embodiments, the thermal load 250 forms a heat exchanger configured to form an air-cooled oil cooler (ACOC), a fuel-cooled oil cooler (FCOC), or other heat exchanger configured to cool a fluid based directly or indirectly the cooled flow of air egressed from the turbine 230. In one embodiment, the thermal load 250 is configured to remove heat or thermal energy, or alternatively, to receive heat or thermal energy, from lubricant or oil-based fluid, a lubricant system of the propulsion system 10, a gearbox cooling fluid, a propeller control mechanism cooling fluid, an electric machine coolant, or other fluid from the propulsion system 10 or vehicle 100 having heat or thermal energy to be desirably released to the cooled flow of air egressed from the turbine 230.

Referring to FIGS. 2-4, certain embodiments of the system 200 include the serial flow arrangement of the flow of air from the compressor section 20 through thermal communication with the first heat exchanger 205 positioned in thermal communication at the third stream flowpath 71. The flow system 200 may further include the flow control device 220 positioned in serial flow arrangement between compressor section 20 and the first heat exchanger 205. The flow of air 201 is extracted from the compressor section 20, such as from the core flowpath 70. The amount of flow is adjusted via the flow control device 220. The flow of air from the flow control device 220, depicted schematically via arrows 211, is provided in thermal communication to the first heat exchanger 205. The initially cooled flow of air, depicted schematically via arrows 211a, is provided to the turbine 230.

Heat or thermal energy remaining in the flow of air 211a from the first heat exchanger 205 is utilized to drive or otherwise provide energy to the load device 270. The expanded and cooled flow of air egresses the turbine 230, such as depicted schematically via arrows 211b, is provided in thermal communication with the thermal load 250. The cooled flow of air 211b receives thermal energy from the thermal load 250, such as described above. The additionally cooled flow of air, depicted schematically via arrows 211c, is egressed from the system. In some embodiments, the flow of air 211c is dumped or provided downstream of the first heat exchanger 205 at the third stream flowpath 71. In another embodiment, the flow of air 211c is provided downstream of the vanes 122 at the fan stream 14. In still other embodiments, the flow of air may be egressed to core flowpath, the third stream flowpath, or the fan bypass flowpath.

Referring to FIG. 2, the thermal load 250 may particularly form a heat exchanger configured to directly cool a fluid or otherwise receive heat or thermal energy from another fluid. In certain embodiments, the thermal load 250 forms an air-cooled fluid cooler.

Referring to FIG. 3, in one embodiment, the thermal load is configured as an air-fluid heat exchanger 250a. A fuel system 300 for the propulsion system 10 or vehicle 100 includes a fuel flow device 275 configured to provide a flow of liquid and/or gaseous fuel, depicted schematically via arrows 276, in thermal communication with the cooled flow of air 211b via the air-fluid heat exchanger 250a. The initially-heated flow of fuel, depicted schematically via arrows 276a, having received heat or thermal energy from the flow of air 211a, is provided to the thermal load via a fuel circuit. The thermal load forms a fuel-fluid heat exchanger 250b configured to receive or remove heat or thermal energy from one or more systems, such as to provide cooling to one or more fluids such as described above.

In certain embodiments, the heated flow of fuel, depicted schematically via arrows 276b, is provided to the heat addition system 26 and burned. The heated fuel may provide desirable physical properties to the fuel to improve combustion performance at the propulsion system 10. The heated flow of fuel 276b may generate desired temperature, viscosity, or other properties that improve atomization, fuel-oxidizer mixing at the heat addition system, and other combustion factors. The desired physical properties of the heated flow of fuel may improve combustion performance, such as by reducing smoke, improving blow-out performance, decreasing emissions (e.g., oxides of nitrogen, carbon monoxide, carbon dioxide, unburned hydrocarbons, etc.), or improving altitude re-light.

In a particular embodiment, the heated flow of fuel, depicted schematically via arrows 276b, is provided to a deoxygenator 277 configured to remove oxygen from the flow of fuel 276b. In a still particular embodiment, the heated, de-oxygenated flow of fuel, depicted schematically via arrows 276c, is provided to a heater 279 configured to provide heat or thermal energy to the flow of fuel 276c. In various embodiments, the heater 279 is a heat exchanger or other appropriate mechanism for heating liquid and/or gaseous fuel. In a particular embodiment, the heater 279 is a non-vitiated fluid heater configured to provide heat or thermal energy to the flow of fuel without oxygenation of the fuel. In such embodiments, the heated, de-oxygenated flow of fuel, depicted schematically via arrows 276d, is provided to the heat addition system 26 for combustion or detonation. In other embodiments, the flow of fuel 276d may additionally, or alternatively, be provided to an inter-turbine burner, an afterburner, or a reheat device generally, such as positioned downstream of the heat addition system 26.

Referring now to FIG. 4, the propulsion system 10 and vehicle 100 may be configured such as described in regard to FIG. 3. In FIG. 4, the fuel system 300 further includes a fuel distribution device 271 configured to adjust proportions of the fuel that are mixed to desired temperatures or other physical properties. The fuel distribution device 271 receives the flow of fuel 276 from the fuel flow device 275. A first flow control device 267, such as a valve or other appropriate mechanism, provides a first portion of the flow of fuel, depicted schematically via arrows 276e, to the air-fluid heat exchanger 250a, such as described in regard to FIG. 3. The initially-heated flow of fuel, depicted schematically via arrows 276f, is provided to a fuel reservoir 273, at which the initially-heated flow of fuel is mixed with unheated (e.g., cold) fuel at the fuel reservoir 273. The mixed fuel is provided to a second flow control device 269 at the fuel distribution device 271, such as depicted via arrows 276g. During operation, the first flow control device 267 adjusts a proportion of fuel directed to the air-fluid heat exchanger 250a versus a portion of fuel that bypasses the air-fluid heat exchanger 250a and routed to the second flow control device 269, such as depicted schematically via arrows 276h.

Referring still to FIG. 4, the second flow control device 269 may return a portion of the flow of fuel directly back to the fuel reservoir 273, such as depicted schematically via arrows 276i. As such, a fuel return loop or circuit is provided at which a portion of fuel heated by the air-fluid heat exchanger 250a is mixed with fuel residing in the fuel reservoir 273. The fuel return loop may increase and maintain a desired minimum temperature of the fuel. The desired minimum temperature of the fuel may be based at least partially on the thermal loads provided by other heat exchangers described herein. In various embodiments, the fuel return loop and fuel distribution device 271 are positioned upstream along the fluid circuit 210 relative to the fuel-fluid heat exchanger 250b and the heater 279 described with regard to FIG. 3.

In still various embodiments, a waste heat recovery (WHR) system 400 is positioned downstream along the fluid circuit 210 of the air-fluid heat exchanger 250a. In a particular embodiment, the WHR system 400 is positioned downstream along the fluid circuit 210 of the fuel distribution device 271. In various embodiments, the WHR system 400 includes a first WHR heat exchanger 410 positioned in parallel with the fuel-fluid heat exchanger 250b. The first WHR heat exchanger 410 is configured to remove heat from a WHR bus fluid.

In various embodiments, the WHR bus fluid is a lubricant (e.g., oil, oil-based fluid, synthetic oil, polyalphaolefin, polyalphaolefin-based fluids, etc., or combinations thereof), a liquid and/or gaseous fuel (e.g., hydrocarbon fuels, fuel oils, aviation turbine fuels, or other appropriate propulsion system fuels), a supercritical fluid (e.g., supercritical carbon dioxide, water, methane, ethane, propane, ethylene, propylene, methanol, ethanol, acetone, nitrous oxide, or other appropriate substance at a temperature and pressure above its end point of a phase equilibrium curve), a silicone or silicone-based heat transfer fluid (e.g., a polydimethylsiloxane-based fluid, such as Syltherm™, or similar fluid), or other appropriate heat transfer fluid.

The first WHR heat exchanger 410 may be configured to cool the WHR bus fluid to substantially a starting temperature upstream of a fluid flow device 420. The cooled fluid allows for maintaining a sufficient temperature difference between the WHR bus fluid and temperature of exhaust combustion gases, such as for steady state heat transfer. A portion of the flow of fuel, depicted schematically via arrows 276j, is provided from the fuel distribution device 271 to the first WHR heat exchanger 410. The flow of fuel 276j is provided in thermal communication with a heat transfer fluid flowing within a WHR circuit 405. The heat transfer fluid may be any desired fluid appropriate for receiving and transmitting heat or thermal energy such as described with regard to the WHR system 400. In particular embodiments, the WHR circuit 405 is a closed-loop system through which the heat transfer fluid flows in thermal communication with the fuel and exhaust gases from the propulsion system 30 such as described herein.

The WHR system 400 includes a fluid flow device 420 configured to pump or otherwise flow the heat transfer fluid through the WHR circuit 405. Although FIG. 4 depicts the first WHR heat exchanger 410 provided a flow of heat transfer fluid 401 to the fluid flow device 420, the fluid flow device 420 may be positioned at any operable position within the WHR circuit 405. A pressurized flow of heat transfer fluid, depicted schematically via arrows 401a, is provided to a second WHR heat exchanger 430. In certain embodiments, the second WHR heat exchanger 430 is a heater device positioned at the exhaust section 36 or the expansion section 30 of the propulsion system 10. The second WHR heat exchanger 430 may be configured to receive heat or thermal energy from exhaust gases exiting the propulsion system 10, such as depicted via arrows 65.

In certain embodiments, the WHR system 400 includes a third WHR heat exchanger 440 positioned in thermal communication with a flow of bleed oxidizer extracted from the compressor section 20 for thermal management at the expansion section 30, such as depicted via arrows 67. In a particular embodiment, the flow of bleed oxidizer 67 is for cooled cooling air (CCA) at the high pressure turbine 32 or low pressure turbine 34. In various embodiments, the CCA is particularly cooled below a temperature of the air a when bled or otherwise removed from the compressor section 20. Additionally or alternatively, the flow of bleed oxidizer 67 is for cooling in general at the expansion section, such as at vanes, shrouds, blades, or bearings, or other desired components. In a still particular embodiments, the flow of bleed oxidizer 67 may be utilized to provide cooling to turbine rotor blades at the expansion section 30. A flow of heat transfer fluid heated by the second WHR heat exchanger 430, depicted schematically via arrows 401b, is provided to the third WHR heat exchanger 440. The flow of heat transfer fluid 401b, although having received heat from the second WHR heat exchanger 430, is relatively cooler than the flow of bleed oxidizer 67 received from the compressor section 20. As such, heat or thermal energy from the flow of bleed oxidizer 67 is provided to the heat transfer fluid via the third WHR heat exchanger 440.

The heated flow of heat transfer fluid from the third WHR heat exchanger 440, depicted schematically via arrows 401c, is provided to the heater 279 in thermal communication with the flow of fuel 276c downstream of the fuel-fluid heat exchanger 250b. In a particular embodiment, a valve or other flow control device 255 receives a heated flow of fuel after receiving thermal communication from the first WHR heat exchanger 410, such as depicted schematically via arrows 276k. The flow control device 255 is configured to desirably combine the flow of fuel 276b with the flow of fuel 276k to output a heated flow of fuel with desired heat or physical properties, depicted schematically via arrows 276bb. In various embodiments, the flow of fuel 276bb is provided to the heat addition system 26 for combustion or detonation. In certain embodiments, the flow of fuel 276bb is provided to the deoxygenator 277 such as described in regard to FIG. 3 with flow of fuel 276b. In a particular embodiment, the flow of fuel is provided in thermal communication to receive heat or thermal energy from the heat transfer fluid at the WHR circuit 405 via the first WHR heat exchanger 410 and the heater 279.

Embodiments of the propulsion system 10 and vehicle 100 provided herein including the energy conversion system 200, the fuel system 300, and/or WHR system 400 provided herein may provide improved overall propulsion system and vehicle efficiency through improved systems, structures, or methods for thermal management and energy conversion such as provided herein. Embodiments provided herein include particular positioning, placement, and serial flows of fluids configured to improve overall system performance. One or more elements of the system, such as, but not limited to, the heat exchangers, circuits, conduits, flow devices, or turbines provided herein may be produced via one or more additive manufacturing methods described below. Still further, such systems may not have been possible without flowpaths, conduits, circuits, structures, or other details allowed by additive manufacturing methods. Furthermore, certain arrangements provided herein may produce beneficial and unexpected results via the transmission of heat or thermal energy to various fluids at particular junctions or serial flows such as provided herein.

Referring now to FIGS. 5-8, various schematic embodiments of the propulsion system 10 and energy conversion system 200 are provided herein. Embodiments provided herein may be configured substantially similarly as described in regard to FIGS. 2-4. In certain embodiments, a flow device 240 is positioned at the fluid circuit 210 downstream of the flow control device 220 and the turbine 230. The flow control device 220 is configured to provide a first portion 211 of fluid to the turbine 230 in parallel with a second portion 212 of fluid provided from the flow control device 220 to the flow device 240. The flow device 240 is configured to combine, mix, or draw together the flows from the first portion 21 and the second portion 212. In various embodiments, the flow device 240 is a fluid mixer, ejector, or other appropriate device configured to allow the relatively higher-pressure stream of fluid at the second portion 212 to draw the relatively lower-pressure stream from first portion 211 together through the fluid circuit 210 as the combined flow of fluid depicted schematically at 213. The fluid circuit 210 is configured to provide the first portion 211 of fluid from the turbine 230 to the flow device 240. A thermal load 250 is positioned in thermal communication with the fluid circuit 210 downstream of the turbine 230.

In various embodiments, the flow control device 220 is a diverter valve or other appropriate mechanism configured to direct ratios or proportions of the first portion 211 and the second portion 212 to the turbine 230 and the flow device 240, respectively. The pressurized flow of fluid from the compressor section 20 is utilized to drive the turbine 230, such as depicted at first portion 211. In certain embodiments, the expanded, decreased-pressure fluid, depicted schematically at 211a, is then routed along the fluid circuit 210 from the turbine 230 to the flow device 240. In still certain embodiments, the expanded, decreased-pressure fluid 211a is routed along the fluid circuit 210 from the turbine 230 to thermal communication with a thermal load 250. After thermal communication with the thermal load 250, the fluid, depicted schematically via arrows 211b, may be provided to the flow device 240, such as depicted in FIG. 3. In another embodiment, the fluid 211b may be discharged or dumped, such as to an engine bay, under engine cowl, or to atmosphere, such as depicted in FIG. 5. The flow device 240 is configured to receive the first portion 211 of fluid from the flow control device 220 and the second portion 212 of fluid from the turbine 230. In certain embodiments, the flow control device 220 is configured to provide the first portion 211 of fluid to the turbine 230 in parallel with the second portion 212 of fluid to the flow device 240, while the second portion 212 of fluid bypasses the turbine 230.

It should be appreciated that conventional thermal management systems generally utilize a valve to restrict or regulate flow from an engine compressor to an air cycle machine compressor. Such systems typically result in relatively large pressure losses across the valve. Such pressure losses result in substantial inefficiencies for the engine and energy conversion systems by compressing the air at the engine compressor then dumping the excessive pressure to control or regulate the flow to the air cycle machine compressor. In contrast, embodiments of the present disclosure utilize the excessive pressure at the turbine 230 to produce useful work, such as via the driveshaft 231 coupled to the turbine 230 and the load device 270, such as provided herein.

The first portion 211 of fluid may generally include a first fluid characteristic different from the second portion 212 of fluid having a second fluid characteristic. In various embodiments, the first fluid characteristic includes a higher pressure or flow rate of the fluid than the second fluid characteristic. The flow device 240 is configured to receive the respective portions 211, 212 of fluid and provide the desired fluid (e.g., having a third fluid characteristic, depicted at fluid 213 of the fluid circuit 210, different from the first and second fluid characteristics of fluid 211 and fluid 212, respectively) downstream along the fluid circuit 210.

Referring to FIGS. 5-6, in various embodiments, the turbine 230 is operably coupled to a turbomachine 260 positioned at the fluid circuit 210. The turbomachine 260 includes a compressor 262 coupled by a driveshaft 264 with a turbine 266. In a particular embodiment, the turbomachine 260 is part of an air cycle system. Embodiments of the turbomachine 260 may include an air cycle machine, a vapor-compression system, or a bootstrap system, or further include an electric machine (e.g., a motor and/or generator), or other suitable device such as described herein. In particular embodiments, the turbomachine 260 is a multi-stage system having a plurality of compressor stages and/or a plurality of turbine stages. However, in other embodiments, the turbomachine 260 may be configured as a single-stage compressor and/or a single stage turbine. The compressor 262 is positioned at the fluid circuit 210 downstream of the flow device 240. In a particular embodiment, the turbine 230 is operably coupled to the driveshaft 264 to provide energy to drive the compressor 262. In a still particular embodiment, the turbine 230 and the turbine 266 of the turbomachine 260 together provide energy to drive the compressor 262.

It should be appreciated that the flow control device 220 allows the fluid circuit 210 to selectively modulate a ratio or proportion of the first portion 211 and the second portion 212 to the turbine 230 and the second control valve 240, respectively. In contrast to a pressure regulator configured to decrease pressure, resulting in work or energy loss for the propulsion system 10 and the energy conversion system 200, the flow control device 220, such as defining a diverter valve or other appropriate device for selectively modulating a proportion of fluid flows to two or more circuits (e.g., first portion 211 and second portion 212), allows the turbine 230 to utilize the relatively high pressure fluid from the compressor section 20 to at least partially drive the turbomachine 260 or the load device 270. The turbine 230 may correspond to a desired fluid characteristic (e.g., a desired second fluid characteristic) for the fluid egressing the turbine 230 to the flow device 240. Additionally, or alternatively, the turbine 230 may correspond to a desired energy output to the turbomachine 260 or load device 270 to which the turbine 230 is operably coupled.

Referring now to FIGS. 2-5, in various embodiments, the vehicle 100, propulsion system 10, and energy conversion system 200 include a heat exchanger 310 positioned at the fluid circuit 210 downstream of the compressor 262 and upstream of the turbine 266 of the turbomachine 260. In various embodiments, the heat exchanger 310 is positioned in thermal communication with one or more fan streams of the propulsion system 10, such as the fan bypass 14 or the third stream flowpath 71. The heat exchanger 310 is configured to expel thermal energy or heat from the fluid circuit 210. In certain embodiments, the heat exchanger 310 is configured to input thermal energy or heat to a fuel circuit, such as to heat a flow of fuel prior to injecting the fuel at the heat addition or combustion section. In still certain embodiments, the heat exchanger 310 is configured to input thermal energy or heat to a stream of air passing through one or more fan streams 14. In still various embodiments, the heat exchanger 310 includes a fuel circuit positioned in thermal communication with the fluid circuit 210.

In certain embodiments, the vehicle 100, propulsion system 10, and energy conversion system 200 include a heat exchanger 315 positioned at the fluid circuit 210 downstream of the compressor section 20 and upstream of the flow control device 220. In various embodiments, the heat exchanger 315 is positioned in thermal communication with one or more fan streams 14 of the propulsion system 10, such as described herein. The heat exchanger 315 is configured to expel thermal energy or heat from the fluid circuit 210. In still certain embodiments, the heat exchanger 315 is configured to input thermal energy or heat to a stream of fluid passing through one or more fan streams 14. In a particular embodiment, the heat exchanger 315 is a precooler positioned at the fluid circuit 210 to remove thermal energy or heat from the fluid prior to providing the fluid to the flow control device 220 and turbine 230. It should be appreciated that various embodiments of the system may include the heat exchanger 315 defining a precooler positioned at the fluid circuit 210 upstream of the flow control device 220.

Referring briefly to FIGS. 7-8, in certain embodiments, the energy conversion system 200 may include a valve 280 positioned at the fluid circuit 210 downstream of the heat exchanger 315 and upstream of the flow control device 220. The valve 280 is configured to provide a portion of the fluid to the expansion section 30 and a portion of the fluid to the flow control device 220, such as described herein. The flow of fluid from the heat exchanger 315 to the valve 280 and the expansion section 30 may define a turbine cooling flow, an active clearance control (ACC) fluid, or other cooling or pneumatic fluid for the propulsion system 10.

In various embodiments, such as depicted in FIGS. 5-8, the thermal load 250 includes a lubricant heat exchanger 320 positioned at the fluid circuit 210 downstream of the turbine 230. In still various embodiments, the thermal load 250 includes a lubricant circuit 251 positioned in thermal communication with the fluid circuit 210. The lubricant circuit 251 includes oil or oil-based fluid from a lubricant system 252. The lubricant system 252 may include any appropriate system including pumps, scavenges, and heat exchangers configured to provide lubricant to one or more bearing assemblies, gear assemblies, actuators, or other systems of the propulsion system 10 or vehicle 100. The lubricant circuit 251 is provided in heat exchanger relationship with the fluid circuit 210 at the lubricant heat exchanger 320.

In certain embodiments, the lubricant heat exchanger 320 is configured to receive or remove heat or thermal energy from the lubricant circuit 251 and provide heat or thermal energy to the fluid circuit 210, or particularly the first portion 211 of fluid downstream of the turbine 230. The flow control device 220 may be configured to adjust an amount of the first portion 211 of fluid provided to the turbine 230 and the thermal load 250 based on a desired heat transfer between the fluid circuit 210 and the lubricant circuit 251.

In certain embodiments, the thermal load 250 is positioned in thermal communication with the fluid circuit 210 downstream of the turbine 230. In particular embodiments, the thermal load 250 including the lubricant system 252 is positioned in thermal communication with the fluid circuit 210 downstream of the turbine 230. In still particular embodiments, such as depicted in FIGS. 2-5, the thermal load 250 including the lubricant system 252 is positioned in thermal communication with the fluid circuit 210 downstream of the turbine 230 and upstream of the flow device 240. In other embodiments, such as depicted in FIGS. 7-8, the thermal load 250 including the lubricant system 252 is positioned in thermal communication with the fluid circuit 210 downstream of the turbine 230 and upstream of a portion of the engine 10. In one embodiment, such as depicted in FIG. 8, the portion of the propulsion system 10 is the expansion section 30, or particular a lower speed spool (e.g., low pressure turbine or intermediate pressure turbine) or an exhaust section 36 of the propulsion system 10.

In various embodiments, the thermal load 250 is positioned in thermal communication with the fluid circuit 210 downstream of the turbomachine 260. In certain embodiments, such as described above, the thermal load 250 includes the lubricant system 252 positioned in thermal communication with the fluid circuit 210 downstream of the turbomachine 260. In still various embodiments, the thermal load 250 includes a load heat exchanger 330 positioned in thermal communication with the fluid circuit 210 downstream of the turbomachine 260. In certain embodiments, the load heat exchanger 330 includes one or more of an electric machine, a computing system, or an environmental control system (ECS) (e.g., the computing system 140 and/or the ECS system 150 described in regard to FIG. 1). The load heat exchanger 330 may be configured to provide the fluid from the fluid circuit 210 as a cooling fluid in thermal communication with the electric machine, the computing system, or the environmental control system, or one or fluids thereof. Various embodiments of the electric machine may include a motor and/or generator, a hybrid-electric device, etc. In still various embodiments, the computing system may include avionics, engine controls, vehicle control systems, or other electronics including one or more processors, memory devices, communications devices, circuitry, or other electrical or electronic systems. In still yet various embodiments, the ECS may include a fluid configured for one or more of the cabin of the vehicle, heat transfer fluid for the vehicle, or other fluid device.

Embodiments of the thermal load 250 may include a first thermal load positioned in thermal communication with the fluid circuit 210 downstream of the turbomachine 260 and a second thermal load positioned in thermal communication with the fluid circuit 210 downstream of the turbine 230 and upstream of the flow device 240. In certain embodiments, the first thermal load includes the load heat exchanger 330 such as described herein. In still certain embodiments, the second thermal load includes the lubricant heat exchanger 320 and lubricant system 252.

Still various embodiments of the energy conversion system 200 may include one or more first valves 290 to divide the fluid at the fluid circuit 210 into a first flow 221 and a second flow 222. The system 200 may further include one or more second valves 291 to reconnect the flows 221, 222. The first valve 290 is positioned upstream of the lubricant heat exchanger 320 and the load heat exchanger 330. The second valve 291 is positioned downstream of the lubricant heat exchanger 320 and the load heat exchanger 330. In certain embodiments, the system 200 includes an exhaust sink 295 at which the fluid from the fluid circuit 210 may be disposed. The exhaust sink 295 may include one or more of an exhaust sink at the turbomachine 260, at the propulsion system 10, or another exhaust sink or ambient environment.

Referring now to FIG. 9 and FIGS. 10A-10B, a flowchart outlining steps for a method for operation of a propulsion system and energy conversion system (hereinafter, "method 1000"). The steps of the method 1000 may be stored as instructions in memory of a computing device or controller, such as one or more computing systems 140 of the propulsion system 10 or vehicle 100. The computing system 140 may include one or more processors operably coupled to the memory to execute the instructions to perform operations at various embodiments of the propulsion system or vehicle such as provided herein. Various embodiments of the methods provided herein may be computer-implemented methods executable by the computing device 140.

The operations include at 1010 determining a base schedule for operating a flow control device (e.g., flow control device 220) to extract a flow of compressed fluid from a compressor section (e.g., compressor section 20) of the propulsion system, and at 1020 operating the flow control device to allow the flow of compressed fluid to a turbine (e.g., turbine 230) operably coupled to a driveshaft (e.g., driveshaft 231) in which the driveshaft is operably coupled to a load device (e.g., load device 270). Methods for operation may further include at 1012 extracting the flow of compressed fluid from the compressor section and flowing the flow of compressed fluid to the turbine based on the base schedule.

In certain embodiments, the base schedule, or particularly the operation (e.g., opening or closing, or portion thereof) of the flow control device corresponds to a mechanical or corrected rotor speed at the HP spool or LP spool, or a rate of change thereof (e.g., transient changes or input signals corresponding to demanded transient changes), or compressor section inlet or exit temperatures (e.g., Station 2.0, Station 2.5, Station 3.0), turbine section temperature (e.g., Station 4.0, Station 4.5, etc.), exhaust gas temperature (EGT), engine pressure ratio (EPR), compressor pressure ratio, predetermined thermal management system heat transfer demand (e.g., based on or corresponding to throttle setting, fan, propeller, or LP spool torque demand, heat exchanger bleed, electric machine load demand, etc., or combinations thereof). In still particular embodiments, operation of the flow control device is based on a thermal capacity of any one or more heat exchangers, such as at the thermal load 250, or other heat exchangers depicted or described with regard to FIGS. 1-8. For example, when the propulsion system 10 is operating at a condition at which air from the fan bypass flowpath, the third stream flowpath, or the core flowpath is insufficient to meet the thermal demand at the energy conversion system, or one or more heat exchangers described herein, the method for control may close the flow control device until the propulsion system is operating at a condition to meet the thermal demand of the system.

Various embodiments of the base schedule may correspond to an initial or baseline operation of the energy conversion system 200 and propulsion system 10. In various embodiments, the method for operation includes receiving, at a base propulsion system control, input signals from propulsion system sensors. In certain embodiments, the input signals are indicative of demanded power or thrust outputs, such as from an avionics system, throttle, or other suitable input device. In still certain embodiments, the supervisory computing system may provide input signals to the base propulsion system control. The supervisory computing system may include a controller configured to receive and send signals to a plurality of propulsion systems, vehicle systems, avionics, or other computing devices. The supervisory computing system may adjust, correct, resolve, average, or determine an input signal, or modification to an input signal, based on an operating mode of another propulsion system, an operating mode of the vehicle (e.g., altitude, attitude, angle of attack, air speed, physical property of air, or other appropriate operating variable). In various embodiments, the base propulsion system control receives an input signal such as described herein corresponding to a demanded operating mode of the propulsion system and energy conversion system.

Methods for operation further include at 1030 adjusting or modulating the energy conversion system based on propulsion system operability, core engine operating parameter limit, or thermal management demand, or combinations thereof. The core engine operating parameter limit corresponds to a pressure and/or temperature limit at the core engine during operation. In certain embodiments, the parameter limit corresponds to a gas flowpath pressure and/or temperature limit at the core engine, entering the core engine, or exiting the core engine. In other embodiments, the parameter limit corresponds to a gas flowpath pressure and/or temperature limit at the core engine relative to a corresponding rotational speed of the HP spool, or demanded HP spool rotational speed.

In still various embodiments, the thermal management demand corresponds to a desired heat transfer rate, maintaining a desired fluid temperature, or adjusting/modulating a fluid temperature. In certain embodiments, the thermal management demand corresponds to maintaining a desired lubricant temperature via heat transfer with a flow of compressed air from the propulsion system. In a particular embodiment, the thermal management demand corresponds to decreasing or maintaining lubricant temperature, such as to maintain or improve lubricant quality, generate a desired physical property at the lubricant system (e.g., generating a desired viscosity, flow rate, pressure, temperature, etc. of lubricant at a bearing assembly or gear assembly), or generate desired vibration response at a bearing assembly or rotor assembly (e.g., HP spool, LP spool, or fan section). In a still particular embodiment, the thermal management demand corresponds to increasing or maintaining lubricant temperature, such as to maintain the lubricant within a desired physical parameter range or temperature range relative to mitigating or eliminating undesired vibrations, rotor whirl, or generating a desired vibration response at the rotor assembly.

Still various embodiments include adjusting or modulating the energy conversion system based on propulsion system operability, such as via adjusting an open or close magnitude of the flow control device (e.g., flow control device 220) based on keeping the HP spool and/or LP spool within an operability limit. The operability limit may correspond to a surge line or stall line of the compressor section.

The method may further include at 1040 determining the more restrictive of the propulsion system operability, core engine operating parameter limit, or thermal management demand, and at 1050 selecting the more restrictive limit to adjust or modulate the energy conversion system. In a particular embodiment, adjusting or modulating the energy conversion system includes adjusting or modulating the flow control device, such as to adjust a flowrate or pressure of the flow of fluid received from the compressor section.

Embodiments of the method further include at 1060 adjusting or modulating the energy conversion system in accordance or corresponding to the more restrictive of the propulsion system operability, core engine operating parameter limit, or thermal management demand. Adjusting or modulating the energy conversion system accordingly may further include opening the flow control device to a maximum allowable open position based on the determined more restrictive limit. Adjusting or modulating the energy conversion system accordingly may further include extracting a maximum flow rate or maximum pressure of the flow of fluid from the compressor section based on the determined more restrictive limit.

Further embodiments of the method may further include at 1070 adjusting or modulating the energy conversion system in accordance or corresponding to a predetermined upper limit or predetermined lower limit corresponding to the core engine. In certain embodiments, the predetermined limits correspond to a maximum or minimum compressor exit pressure (or combustion section inlet pressure, or Station 3.0), a maximum or minimum compressor exit temperature (or combustion section inlet temperature, or Station 3.0), or a heath and safety limit at the core engine.

In a particular embodiment, the method includes the serial steps for determining the adjustment or modulation of energy conversion system, or particularly the flow control device, of 1) determining a base schedule; 2) determining the more restrictive limit of the operability adjustment, the core engine parameter limit, or the thermal management demand; 3) selecting the maximum open or corresponding flowrate or pressure based on the determined more restrictive limit; and 4) adjustment or modulation based on the predetermined upper limit or lower limit, or combinations of steps thereof.

In various embodiments, a method for energy conversion includes at 1012 extracting the flow of compressed fluid from the compressor section and flowing the flow of compressed fluid to the turbine based on the base schedule; at 1014 flowing the compressed fluid to the turbine based on the base schedule; at 1016 expanding the flow of compressed fluid through the turbine to generate an output torque at the driveshaft to operate the load device; and at 1018 flowing the expanded flow of compressed fluid from the turbine to thermal communication with a thermal load, such as described herein with regard to FIGS. 1-8.

In certain embodiments, the method includes at 1022 flowing the compressed fluid from the thermal load to a fan bypass stream of the propulsion system. In an embodiment, the method includes at 1024 flowing the compressed fluid from the thermal load to a third stream flowpath of the propulsion system. In another embodiment, the method includes at 1026 flowing the flow of compressed fluid from the compressor section of the propulsion system to thermal communication with a first heat exchanger positioned at a third stream flowpath of the propulsion system.

The computing system 140 and method may further include a control loop feeding an actual position of the flow control device (e.g., valve opening/closing percentage, valve flow area, actuator opening/closing percentage, linear variable differential transformer signal, rotary variable differential transformer signal, or other signal indicative of flow rate of fluid across the flow control device) to a based power plant controller, such as the computing device 140. It should be appreciated that the method provided herein may include receiving or sending signals indicative of flow rates, pressures, temperatures, fluid physical properties, valve or actuator positions, rotational speeds, or other signals indicative of a state of propulsion system operation and energy conversion system operation.

It should be appreciated that the computing system 140 may include components suitable for processor-based functions and operations at the propulsion system 10, vehicle 100, and energy conversion system 200. The computing system 140 can correspond to any suitable processor-based device, including one or more computing devices, such as described above. In certain embodiments, the computing system 140 is a full-authority digital engine controller (FADEC) for a gas turbine engine, or other computing module or controller configured to execute instructions for operating a propulsion system or vehicle. The computing system 140 can include a processor 142 and associated memory 144 configured to perform a variety of computer-implemented functions.

As shown, the computing system 140 can include control logic 146 stored in memory 144. The control logic 146 may include instructions 147 that when executed by the one or more processors 142 cause the one or more processors 142 to perform operations, such as one or more steps of the method 1000 provided herein. Additionally, the computing system 140 can also include a communications interface module 148. In several embodiments, the communications interface module 148 can include associated electronic circuitry that is used to send and receive data. As such, the communications interface module 148 of the computing system 140 can be used to send and/or receive data to/from propulsion system 10. In addition, the communications interface module 148 can also be used to communicate with any other suitable components of the propulsion system 10, such as described herein.

It should be appreciated that the communications interface module 148 can be any combination of suitable wired and/or wireless communications interfaces and, thus, can be communicatively coupled to one or more components of the power generation system via a wired and/or wireless connection or distributed network. The communications interface module 148 can include any suitable wired and/or wireless communication links for transmission of the communications and/or data, as described herein. For instance, the module 148 can include a SATCOM network, ACARS network, ARINC network, SITA network, AVICOM network, a VHF network, a HF network, a Wi-Fi network, a WiMAX network, a gatelink network, etc.

Embodiments of the propulsion system 10, vehicle 100, and energy conversion system 200 may improve system efficiency, such as through utilizing the pressure of the fluid from the compressor section of the propulsion system, or particularly from a high pressure compressor, rather than utilizing a pressure regulator or releasing fluid to e.g., an atmospheric condition. Embodiments provided herein may further improve heat transfer from lubricant at a lubricant system. Still further, embodiments provided herein may improve heat transfer from lubricant and additionally from one or more load devices, such as the load heat exchanger. Additionally, or alternatively, cooling fluid at the fluid circuit 210 may be independently adjustable relative to operating condition at the propulsion system 10, such as via the flow control device 220 and/or the flow device 240.

One or more components of the propulsion system 10 and energy conversion system 100 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the turbine 230 and the flow control device 220 as a single, integral component. In further embodiments, the additive manufacturing methods described herein allow for the manufacture of the turbine 230, the flow control device 220, and at least a portion of the conduit 210 having unique features, configurations, thicknesses, materials, densities, fluid passageways, headers, and mounting structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method for energy conversion for a vehicle, the method including extracting a flow of compressed fluid from a compressor section of a propulsion system; flowing the flow of compressed fluid to a turbine operably coupled to a driveshaft, wherein the driveshaft is operably coupled to a load device; expanding the flow of compressed fluid through the turbine to generate an output torque at the driveshaft to operate the load device; and flowing the expanded flow of compressed fluid from the turbine to thermal communication with a thermal load.

2. The method of any one or more clauses herein, the method including flowing the compressed fluid from the thermal load to a fan bypass stream of the propulsion system.

3. The method of any one or more clauses herein, the method including flowing the compressed fluid from the thermal load to a third stream flowpath of the propulsion system.

4. The method of any one or more clauses herein, the method including flowing the flow of compressed fluid from the compressor section of the propulsion system to thermal communication with a first heat exchanger positioned at a third stream flowpath of the propulsion system.

5. The method of any one or more clauses herein, wherein the thermal load is an air-fluid heat exchanger, and wherein flowing the expanded flow of compressed fluid from the turbine to thermal communication with the thermal load comprises providing the flow of compressed fluid in thermal communication with a flow of fuel.

6. The method of any one or more clauses herein, the method including providing the flow of fuel to thermal communication with a fuel-fluid heat exchanger after thermal communication with the flow of compressed fluid.

7. The method of any one or more clauses herein, the method including providing the flow of fuel to a heat addition system of the propulsion system after thermal communication with the fuel-fluid heat exchanger.

8. The method of any one or more clauses herein, the method including deoxygenating the flow of fuel after thermal communication with the fuel-cooler fluid cooler.

9. The method of any one or more clauses herein, the method including providing the flow of fuel to thermal communication with a heater after thermal communication with the fuel-fluid heat exchanger.

10. The method of any one or more clauses herein, wherein providing the flow of fuel to thermal communication with the heater comprises providing the flow of fuel to thermal communication with a waste heat recovery system.

11. The method of any one or more clauses herein, wherein providing the flow of fuel to thermal communication with the waste heat recovery system includes flowing a heat transfer fluid in a closed-loop circuit in thermal communication with an expansion section or exhaust section of the propulsion system, wherein flowing the heat transfer fluid in thermal communication with the expansion section or the exhaust section receives thermal energy generated from exhaust gases at the propulsion system; and providing thermal energy from the heat transfer fluid to the flow of fuel via the heater.

12. The method of any one or more clauses herein, the method including flowing the flow of fuel from thermal communication with a waste heat recovery heat exchanger in parallel with the fuel-fluid heat exchanger.

13. The method of any one or more clauses herein, wherein providing thermal energy from the heat transfer fluid to the flow of fuel via the heater is downstream of the fuel-fluid heat exchanger relative to the flow of fuel.

14. The method of any one or more clauses herein, wherein the thermal load is configured to transmit thermal energy from a lubricant, a gear assembly cooling fluid, a propeller control mechanism cooling fluid, or an electric machine cooling fluid.

15. The method of any one or more clauses herein, wherein the thermal load is configured as an air-cooled oil cooler.

16. A vehicle including a propulsion system including a fan section, a compressor section, a heat addition system, and an expansion section in serial flow arrangement, wherein a core flowpath is formed through the compressor section, the heat addition system, and the expansion section, and wherein a fan bypass stream is configured to bypass the core flowpath, and wherein a third stream flowpath is configured to bypass the heat addition system; an energy conversion system comprising a fluid circuit forming serial fluid communication of a flow of oxidizer from the compressor section to a turbine, and wherein the fluid circuit provides serial fluid communication from the turbine to a thermal load at which the flow of oxidizer is in thermal communication with a flow of fluid at the thermal load; and a load device operably coupled to the turbine by a driveshaft, wherein the turbine and driveshaft are configured to generate an output torque at the load device via expansion of the flow of oxidizer at the turbine.

17. The vehicle of any one or more clauses herein, the vehicle including a first heat exchanger positioned in thermal communication with the third stream flowpath, wherein the first heat exchanger is positioned in thermal communication with the fluid circuit in serial flow arrangement between the compressor section and the turbine.

18. The vehicle of any one or more clauses herein, the vehicle including a fuel system configured to provide a flow of fuel in thermal communication with the flow of oxidizer at the thermal load.

19. The vehicle of any one or more clauses herein, wherein the fuel system includes a fuel-fluid heat exchanger configured to receive the flow of fuel from thermal communication with the flow of oxidizer from the turbine, wherein the flow of fuel is flowed into thermal communication with a flow of one or more of a lubricant, a gear assembly cooling fluid, a propeller control mechanism cooling fluid, or an electric machine cooling fluid.

20. The vehicle of any one or more clauses herein, the vehicle including a waste heat recovery system configured in thermal communication with the flow of fuel.

21. A vehicle configured to execute the method of any one or more clauses herein.

22. A computer-implemented method for operating a vehicle, the method comprising determining a base schedule for operating a flow control device to extract a flow of compressed fluid from a compressor section of the propulsion system; operating the flow control device to allow the flow of compressed fluid to a turbine operably coupled to a driveshaft operably coupled to a load device; modulating the energy conversion system based on propulsion system operability, core engine operating parameter limit, or thermal management demand; determining the more restrictive of the propulsion system operability, core engine operating parameter limit, or thermal management demand; and modulating the energy conversion system corresponding to the more restrictive of the propulsion system operability, core engine operating parameter limit, or thermal management demand.

22. The computer implemented method of any one or more clauses herein, the method comprising selecting the more restrictive limit to adjust or modulate the energy conversion system.

23. The computer implemented method of any one or more clauses herein, the method comprising modulating the energy conversion system corresponding to a predetermined upper limit or predetermined lower limit corresponding to the core engine.

24. The computer implemented method of any one or more clauses herein, the computer-implemented method comprising the method of any one or more clauses herein.

25. A computing system for a vehicle, the computer system comprising one or more processors and one or more memory, wherein the memory is configured to store instructions that, when executed by the one or more processors, performs operations, the operations comprising the method of any one or more clauses herein.

26. A computing system for a vehicle, the computer system comprising one or more processors and one or more memory, wherein the memory is configured to store instructions that, when executed by the one or more processors, performs operations, the operations comprising the computer-implemented method of any one or more clauses herein.

27. The computing system of any one or more clauses herein, configured to operate the vehicle of any one or more clauses herein.

28. A vehicle of any one or more clauses herein, comprising the computing system of any one or more clauses herein.

29. A propulsion system, the propulsion system comprising the computing system of any one or more clauses herein.

30. A propulsion system configured to execute steps of the method of any one or more clauses herein.

What is claimed is:

1. A method for energy conversion for a vehicle, the method comprising:
    extracting a flow of compressed fluid from a compressor section of a turbomachine, wherein the turbomachine includes the compressor section, a combustion section, a high pressure turbine, and a low pressure turbine in serial aerodynamic flow arrangement and defining a core flowpath through the turbomachine, wherein the turbomachine further defines a core bypass stream defined radially outward from the core flowpath, and a fan bypass stream defined radially outward from the core bypass stream;
    passing the flow of compressed fluid from the compressor section of the turbomachine through the fan bypass stream and into a flow control device;
    routing, via the flow control device, a first portion of the flow of compressed fluid from the compressor section to a turbine, wherein the turbine is operably coupled to a driveshaft, and wherein the driveshaft is operably coupled to a load device;
    routing, via the flow control device, a second portion of the flow of compressed fluid from the compressor section to a flow device;
    expanding the first portion of the flow of compressed fluid through the turbine to generate an output torque at the driveshaft to operate the load device;
    flowing the expanded flow of compressed fluid from the turbine to provide heating or cooling to a thermal load;
    mixing the second portion of the flow of compressed fluid from the compressor section with the expanded flow of compressed fluid from the thermal load via the flow device to provide a mixed flow of compressed fluid; and
    routing the mixed flow of compressed fluid from the flow device to an air-fluid heat exchanger, and wherein the mixed flow of compressed fluid is in thermal communication with a flow of fuel.

2. The method of claim 1, the method comprising:
    flowing the mixed flow of compressed fluid from the flow device into the fan bypass stream.

3. The method of claim 1, the method comprising:
    providing the flow of fuel to thermal communication with a fuel-fluid heat exchanger after thermal communication with the expanded flow of compressed fluid.

4. The method of claim 3, the method comprising:
    providing the flow of fuel to a heat addition system of the vehicle after thermal communication with the fuel-fluid heat exchanger.

5. The method of claim 4, the method comprising:
    deoxygenating the flow of fuel after thermal communication with the fuel-fluid heat exchanger.

6. The method of claim 4, the method comprising:
    providing the flow of fuel to thermal communication with a heater after thermal communication with the fuel-fluid heat exchanger.

7. The method of claim 6, wherein providing the flow of fuel to thermal communication with the heater comprises providing the flow of fuel to thermal communication with a waste heat recovery system.

8. The method of claim 7, wherein providing the flow of fuel to thermal communication with the waste heat recovery system comprises:
    flowing a heat transfer fluid in a closed-loop circuit in thermal communication with an expansion section or exhaust section of the vehicle, wherein flowing the heat transfer fluid in thermal communication with the expansion section or the exhaust section receives thermal energy generated from exhaust gases at the vehicle; and
    providing thermal energy from the heat transfer fluid to the flow of fuel via the heater.

9. The method of claim 8, the method comprising:
    flowing the flow of fuel from thermal communication with a waste heat recovery heat exchanger in parallel with the fuel-fluid heat exchanger.

10. The method of claim 9, wherein providing thermal energy from the heat transfer fluid to the flow of fuel via the heater is downstream of the fuel-fluid heat exchanger relative to the flow of fuel.

11. The method of claim 1, wherein the thermal load is configured as an air-cooled oil cooler.

* * * * *